United States Patent
Jackson et al.

(10) Patent No.: US 9,569,535 B2
(45) Date of Patent: Feb. 14, 2017

(54) SYSTEMS AND METHODS FOR KEYWORD RESEARCH AND CONTENT ANALYSIS

(71) Applicants: Sean Jackson, Dallas, TX (US); Brian Clark, Boulder, CO (US); Chris Thompson, Fort Worth, TX (US)

(72) Inventors: Sean Jackson, Dallas, TX (US); Brian Clark, Boulder, CO (US); Chris Thompson, Fort Worth, TX (US)

(73) Assignee: Rainmaker Digital LLC, Dallas, TX (US)

( * ) Notice: Subject to any disclaimer, the term of this patent is extended or adjusted under 35 U.S.C. 154(b) by 687 days.

(21) Appl. No.: 14/032,716

(22) Filed: Sep. 20, 2013

(65) Prior Publication Data

US 2014/0089290 A1   Mar. 27, 2014

Related U.S. Application Data (60) Provisional application No. 61/705,026, filed on Sep. 24, 2012.

(51) Int. Cl.
*G06F 17/30* (2006.01)

(52) U.S. Cl.
CPC .............. *G06F 17/30864* (2013.01)

(58) Field of Classification Search
CPC .............. G06F 17/30864; G06F 1/0307; G06F 17/30861; G06F 17/30867
USPC .............. 717/106, 102, 108, 110, 139, 143; 707/999.003, 999.005, E17.079, E17.086, 707/999.006, E17.108, 708, 754, 759, 707/E17.015, 692, 705, 706, 709, 711, 707/723, 730, 748, 750, 767, 769, 791, 707/802, 812, 999.002, 999.004; 715/205, 715/206, 212, 219, 217, 220, 230, 715/207, 208, 234, 255, 256, 781
See application file for complete search history.

(56) References Cited

U.S. PATENT DOCUMENTS

| | | | | |
|---|---|---|---|---|
| 5,692,176 A | * | 11/1997 | Holt | G06F 17/274 |
| 6,314,506 B1 | * | 11/2001 | Stanton | G06F 7/02 365/230.01 |
| 6,473,753 B1 | * | 10/2002 | Katariya | G06F 17/277 |
| 6,704,727 B1 | * | 3/2004 | Kravets | G06F 17/30864 |
| 7,885,952 B2 | | 2/2011 | Chellapilla et al. | |
| 8,135,706 B2 | | 3/2012 | Yu et al. | |
| 8,135,728 B2 | | 3/2012 | Yih et al. | |
| 8,136,034 B2 | | 3/2012 | Stanton et al. | |
| 8,515,972 B1 | * | 8/2013 | Srikrishna | G06F 17/30864 707/750 |

(Continued)

FOREIGN PATENT DOCUMENTS

| | | | |
|---|---|---|---|
| EP | 2194466 A1 | 6/2010 | |
| GB | WO 9843181 A1 * | 10/1998 | G06F 3/16 |
| GB | 2451691 A | 11/2009 | |

*Primary Examiner* — Jay Morrison
*Assistant Examiner* — Ken Hoang
(74) *Attorney, Agent, or Firm* — Kirby B. Drake; Klemchuk LLP (57) ABSTRACT

Interaction of a user with external data sources related to the research and analysis of terms and content for improved indexing by search engines may be provided. One or more elements of the content may be used to return an analysis of those elements to the user within the experience of a word processing application environment. Systems and methods also may be provided for determining the relative competition of a term or terms to quantitatively derive the number of pages within a corpus that may be actively engaged to improve the indexing of the pages by information retrieval systems, such as search engines. Systems and methods may be further provided for determining the relative ranking of a term or terms based on the frequency and placement of the term or terms within a structured page.

6 Claims, 7 Drawing Sheets

(56) References Cited

U.S. PATENT DOCUMENTS

| | | | |
|---|---|---|---|
| 8,819,000 B1* | 8/2014 | Acharya | G06F 17/30 |
| | | | 707/723 |
| 2004/0186831 A1* | 9/2004 | Hiratsuka | G06F 17/30675 |
| 2007/0185865 A1* | 8/2007 | Budzik | G06F 17/30389 |
| 2007/0244866 A1* | 10/2007 | Mishkanian | G06F 17/3064 |
| 2008/0071779 A1* | 3/2008 | Mammen | G06F 17/30516 |
| 2010/0318538 A1 | 12/2010 | Wyman et al. | |
| 2011/0264682 A1* | 10/2011 | Song | G06F 17/30781 |
| | | | 707/769 |
| 2011/0313852 A1 | 12/2011 | Kon et al. | |
| 2012/0036119 A1 | 2/2012 | Zwicky et al. | |
| 2012/0047120 A1 | 2/2012 | Connolly et al. | |
| 2012/0109932 A1 | 5/2012 | Li et al. | |
| 2012/0254152 A1 | 10/2012 | Park et al. | |
| 2013/0080419 A1* | 3/2013 | Thazhathekalam | G06F 17/30696 |
| | | | 707/722 |

\* cited by examiner

SYSTEMS AND METHODS FOR KEYWORD RESEARCH AND CONTENT ANALYSIS

CROSS-REFERENCE TO RELATED APPLICATION

The present application claims the benefit of U.S. Provisional Application No. 61/705,026 entitled "Systems and Methods for Keyword Research and Content Analysis," filed Sep. 24, 2012, the disclosure of which is hereby incorporated by reference in its entirety.

FIELD OF THE DISCLOSURE

The present disclosure generally relates to keyword research and content analysis, and more particularly to systems and methods for keyword research and content analysis integrated into a word processing application.

BACKGROUND

A user that wishes to optimize their content for better search engine indexing will employ a number of manual heuristic processes. These processes include manual inspection of index counts from commercial search engines to gauge competition online and a visual inspection of content to review the placement of terms within the content.

SUMMARY

Embodiments of the present disclosure may provide for interaction of a user with external data sources related to the research and analysis of terms and content for improved indexing by search engines. Accordingly, one or more elements of the content may be used to return an analysis of those elements to the user within the experience of a word processing application environment. Embodiments of the present disclosure may further provide systems and methods for determining the relative competition of a term or terms to quantitatively derive the number of pages within a corpus that may be actively engaged to improve the indexing of the pages by information retrieval systems, such as search engines. Embodiments of the present disclosure also may provide systems and methods for determining the relative ranking of a term or terms based on the frequency and placement of the term or terms within a structured page.

Embodiments of the present disclosure may provide a computer-based method for keyword competition analysis, the method comprising providing a web corpus indexed by a search engine that is logarithmically scaled into a log value index via a processor, using the web corpus, applying at least one search filter to return a total number of pages within the web corpus, scaling the total number of pages to a log value pages, dividing the log value pages by the log value index to generate a result range, the log value pages, the log value index, and the result range stored in a memory within the computer, and using a processor, multiplying the result range by 100 and presenting the multiplied result range as a competition scale number, wherein a competition scale number above 51 represents a highly competitive keyword. The at least one search filter may be selected from the group comprising inclusion of the exact keyword in a structured page within the HTML title, meta description, and body of content elements. The method also may comprise instructing a user that the higher the competition scale number is on a scale of 0 to 100, the more competitive the keyword is.

Embodiments of the present disclosure may further provide a computer-based method of search term ranking, the method comprising receiving a corpus of search terms forming a database index and storing in a computer memory, comparing the search terms in the database index to search terms identified within a page to generate a target list, generating a frequency count of the number of times that each of the search terms is used within the page, and determining a density by dividing the frequency count by the total number of unique search terms found in the page, wherein each of the steps is performed by one or more processors. The database index may include the search terms and the number of times that the search terms have been entered into one or more search engines within a defined time period.

The comparing step also may comprise loading the search terms in the database index into a computer memory, and using a regular expression command to a processor, examining the search terms and identifying parts that match through a bit expression of 1 or 0, wherein 1 indicates the comparison is a match and 0 indicates that that the comparison does not match. The method also may comprise recording a median density for all search terms in the target list, wherein the median density is determined by sending an instruction to a processor to load from the computer memory each value that represents a density of a search term, instructing the processor to create an array in the computer memory of each value and order the array from the lowest value to the highest value, and sending an instruction to the processor to identify the value in the array that represents the middle value in the array. The method may further comprise sending an instruction to a processor to load into the computer memory an array of all characters within a page, assigning a value to each character beginning at 1, sending an instruction to the processor to perform a regular expression comparison, and when a first search term is found through the regular expression comparison, recording the value of the starting character of the first search term. In some embodiments of the present disclosure, the method also may comprise identifying additional search terms through the regular expression comparison, and ignoring previously found search terms by sending an instruction to the processor to construct an array in memory of terms found, wherein terms not found are not included in the array. The method could also comprise calculating the prominence of a search term by sending an instruction to a processor to create an array in the computer memory of a value representing the frequency of each search term and a value of the placement of each search term, and sending an instruction to the processor to identify the prominence value through dividing the frequency value of a search term by the value of the placement of the search term, wherein if the prominence value is at least 0.6, the prominence is high. In other embodiments of the present disclosure, the method may further comprise creating a ranking of a search term by sending an instruction to the processor to create an array in the computer memory of the values of each search term's density and prominence, and sending an instruction to the processor to use a logical computation to compare the values in the array of each search term's density and prominence values against a median density held in a separate array, wherein if the target list term density is greater than the median density and the prominence value is at least 0.6, the ranking of the keyword is primary.

Embodiments of the present disclosure also may provide a system for interaction between a word processing computer program and external data sources to search and analyze terms and content for improved indexing by search engines, the system comprising a template accessible through the word processing computer program, the template including a list of input fields to receive one or more items of text, an application that loads a user-input form that includes input fields retrieved from the template that are populated upon launch of the application, and a remote web service that receives from the application one or more terms provided on the user-input form, analyzes the terms and returns a response over a communication link between the application and the remote web service that includes an analysis of the terms related to their usage within the search engines. The one or more items of text may align with and be used by one or more structural markup languages. The application also may comprise a pop-up window having one or more inputs to receive web publishing information, the web publishing information selected from the group comprising HTML title, meta description, keyword and publishing site. The response may further include an analysis of how the terms are structured. The response also may include an analysis that compares that terms within a page to terms used within a website. The system may further comprise an input mechanism within the template wherein when a user selects a term within the one or more items of text provided in the template, the application opens and the term selected is populated in an input field within the application for submission to the remote web service. The input fields in the template may be selected from the group comprising website URL, target terms, HTML title, and meta description. The template also may comprise content information including content and a headline of the content.

BRIEF DESCRIPTION OF THE DRAWINGS

For a more complete understanding of this disclosure, reference is now made to the following description, taken in conjunction with the accompanying drawings, in which.

DETAILED DESCRIPTION

Embodiments of the present disclosure may provide systems and methods for determining the relative competition of a term or terms to quantitatively derive the number of pages (such as structured markup pages like HTML) within a corpus that may be actively engaged to improve the indexing of the pages by information retrieval systems, such as search engines. This may be referred to as a content competition formula (see FIG. 1) according to embodiments of the present disclosure.

In embodiments of the present disclosure, in a first step (see FIG. 1, step 1,), a corpus of all pages available on the World Wide Web (WWW) may be used as a data source. A search engine may have indexed this corpus so that elements of the page may be filtered and retrieved. The total number of all the page in the corpus may then be logarithmically scaled into a log value index to form the denominator of the equation. More specifically, an instruction may be provided to a processor to compute a common logarithm for the value X, representing a numeric, positive number of the total number of pages in the corpus and held in memory. The mathematical formula provided to the processor for computation may take the form of Log 10(X)=Y where Y may represent the log value index and may be used as the denominator of the equation.

In a second step (see FIG. 1, step 2), based on this corpus, a search (or query filter) may be applied that returns the total number of pages within the web corpus based on, but not limited to, the inclusion of the exact term(s) in the structured page within the HTML title, meta description and the body of the content elements. An example of a search query filter for the term "lawyer" on a search engine like Bing, may follow the following form: intitle: "Lawyer" and inbody: "Lawyer" and literalmeta: "Lawyer" where "intitle" may represent the filter for only terms in the HTML <title> element of a page that includes the exact term "Lawyer," "inbody" may represent the filter for only terms in the HTML <body> element of a page that includes the exact term "Lawyer," "literalmeta" may represent the filter for only terms in the HTML <meta description> element of a page that includes the exact term "Lawyer," and where "and" may instruct the overall filter to only find pages where the condition of all filters are true.

In a third step, the results of the total number of pages may then be logarithmically scaled to a normalized number (log value pages) to form the numerator of the equation (see FIG. 1, step 3), in a manner similar to that described with respect to the denominator (corpus). In a fourth step, the numerator (pages) and denominator (corpus) may then be divided to produce a result range from 0 to 1 (see FIG. 1, step 4). This result may then be multiplied by 100 and presented or displayed to a user as competition scale in a fifth step (see FIG. 1, step 5) according to embodiments of the present disclosure. An instruction may be provided to the processor to compute the multiplication product of two numbers held in memory. More specifically, the arguments X and Y may be read from memory and multiplied together to form a result, where X may represent the product of FIG. 1, step 4 and Y may represent the value of 100 held in memory.

Figure 1:
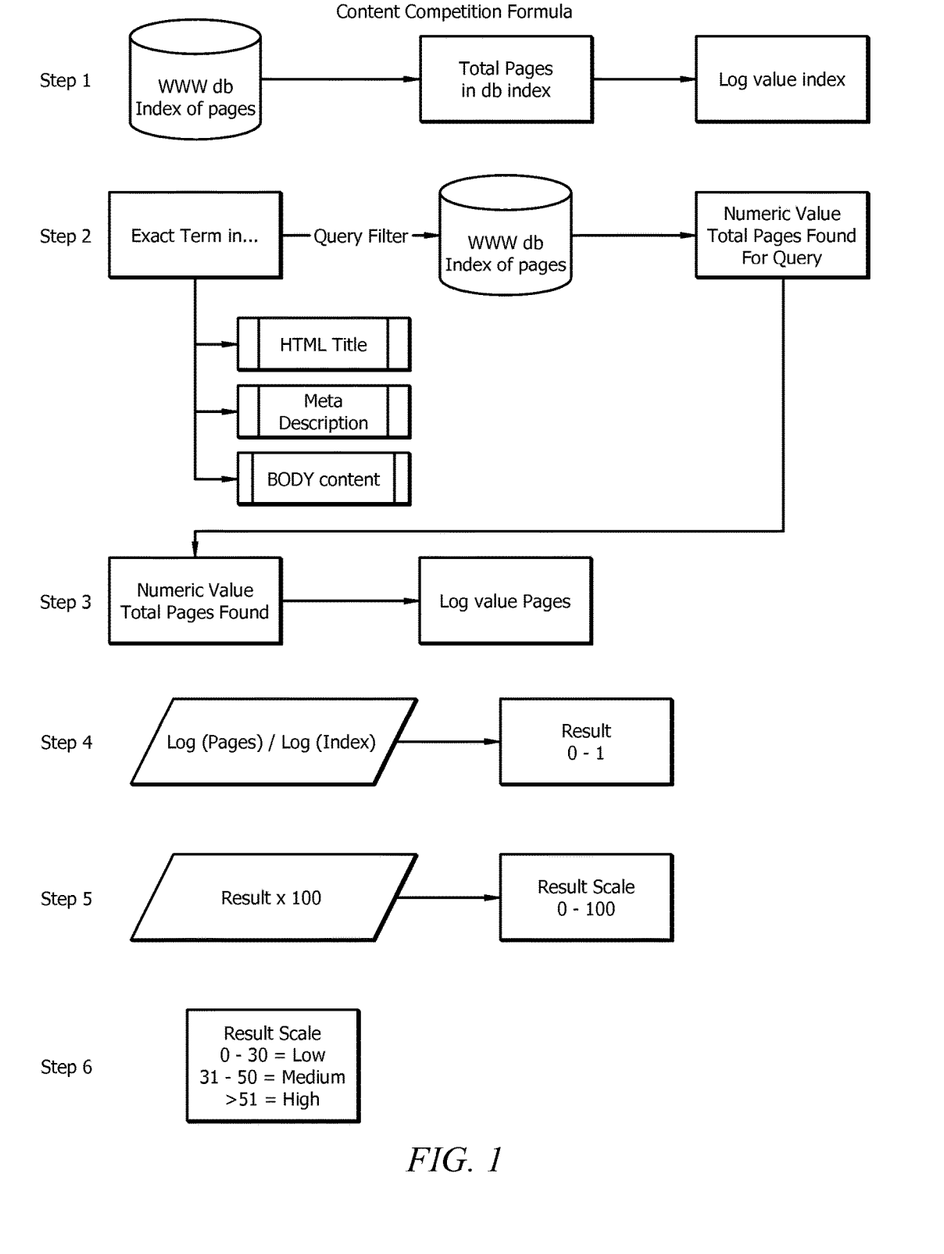
FIG. 1 depicts a system and method for determining content competition according to an embodiment of the present disclosure.

In a final step (see FIG. 1, step 6), the user may then be instructed that the higher the number on the competition scale, the more competitive the term(s) are. Conversely, the lower the number of the competition scale, the less competitive the term(s) are. As depicted in FIG. 1, the competitive scale may provide that a number falling between 0 and 30 is low, 31-50 is medium, and over 51 is high. However, the number ranges with respect to the competitive scale may be altered without departing from the present disclosure.

Embodiments of the present disclosure may provide systems and methods for determining the relative ranking of a term or terms based on the frequency and placement of the term or terms within a structured page (like HTML). This may be referred to as a term ranking formula (see FIGS. 2A-2D) according to embodiments of the present disclosure.

Figure 2A:
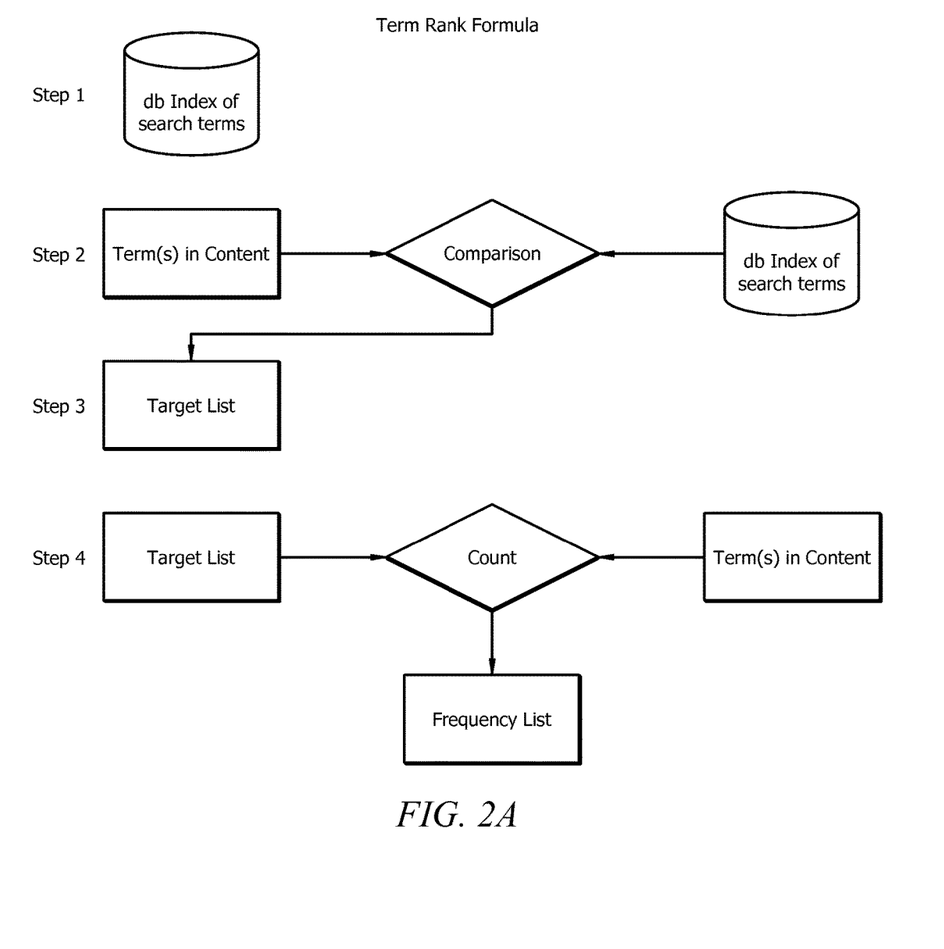
FIGS. 2A-2D depicts a system and method for determining term ranking according to an embodiment of the present disclosure.

In embodiments of the present disclosure, a corpus of terms entered by users in one or more search engines may form the baseline data source or a database index of search terms (see FIG. 2A, step 1). This data source may include the terms as well as the number of times the terms have been entered into one or more search engines within a defined time period. The terms contained within the data source may then be compared to the terms within a page (see FIG. 2A, step 2). The processing of comparison may begin by loading the terms of each source into computer memory. Using a regular expression command to the processor, the parser generator may begin to examine the text and identify parts that match through bit expression of either 1 or 0; where 1 may indicate the comparison matches and 0 may indicate where the comparison does not match.

In an embodiment of the present disclosure, the comparison may begin with all 6-word terms, ordered by the number of words contained within a phrase, and then compared to the words within the page in 6-word combinations. Six word combinations may be selected based on published research by Google Inc (http://infoscience.epfl.ch/record/99356/files/SilversteinHMM99.pdf?version=1) on the average number of terms in a query. Specifically the average number of terms is 2.35 with the standard deviation of terms in a query at 1.74. By analyzing terms based on approximately two standard deviations from the average, the comparison may account for more than 98% of all types of search queries performed by users in a commercial search engine. All occurrences of the term(s) may then be extracted from the page comparison leaving the remaining words. The process of extraction may include an instruction to the processor to read from memory the occurrence of the terms and creating a separate memory array to store the terms found. Hence the resulting memory may include two arrays; one with terms not found and one with terms found. This method may be repeated for each term contained within the data source, beginning with a 6-word comparison down to a 1-word comparison. It should be appreciated that other numbers of word combinations may be utilized without departing from the present disclosure. The terms that may be identified through such a comparison may form the target list (see FIG. 2A, step 3).

For each term in the target list, a count may be made of the number of times that the term is used within a page. This count along with the term identification may form a frequency list (see FIG. 2, step 4). For each term in the target list, the density may be calculated by taking the frequency count and dividing that by the total number of unique words found in the content (see FIG. 2B, step 5). A median density may be recorded for all terms contained in the target list (see FIG. 2B, step 6). A median density may be calculated by sending an instruction to the processor to load from memory each numeric value that may represent the density of a term, instruct the processor to create an array in memory of each value and order the array by the lowest value to the highest value. Once loaded into memory, an instruction may be sent to the processor to find the value in the array that may represent the middle value in the array. This median density may be loaded into memory for further processing.

Figure 2B:
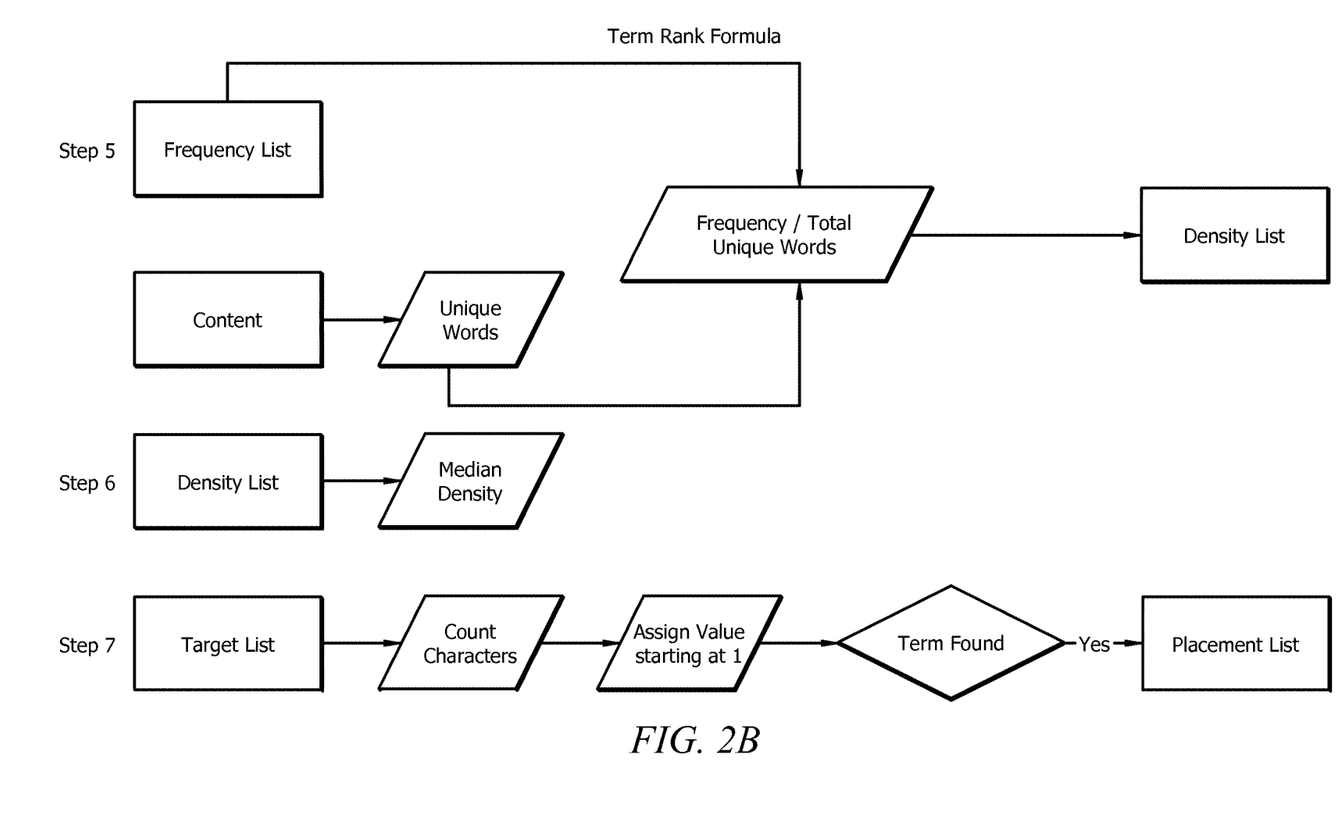

The placement of each term in the target list also may be calculated (see FIG. 2B, step 7). All characters within the content may be assigned a numerical value beginning at 1. The target list may then be compared to the content, starting with any 6-word terms, according to an embodiment of the present disclosure. An instruction may be sent to the processor to load into memory an array of all characters within the content and then assigning a numeric value to each character starting at 1. In addition, an instruction may be sent to the processor to load into memory an array of the target list terms. Once created, an instruction may be sent to the processor to perform a regular expression comparison. When a term is found through this comparison, the numerical value of the starting character of the term may be recorded and may represent the position for that term. As additional terms may be compared in the content, previously found terms may be ignored and would not be considered as part of the comparison. Terms may be ignored by sending an instruction to the processor to construct an array in memory of terms found. Terms not found are not included in the array.

Figure 2C:
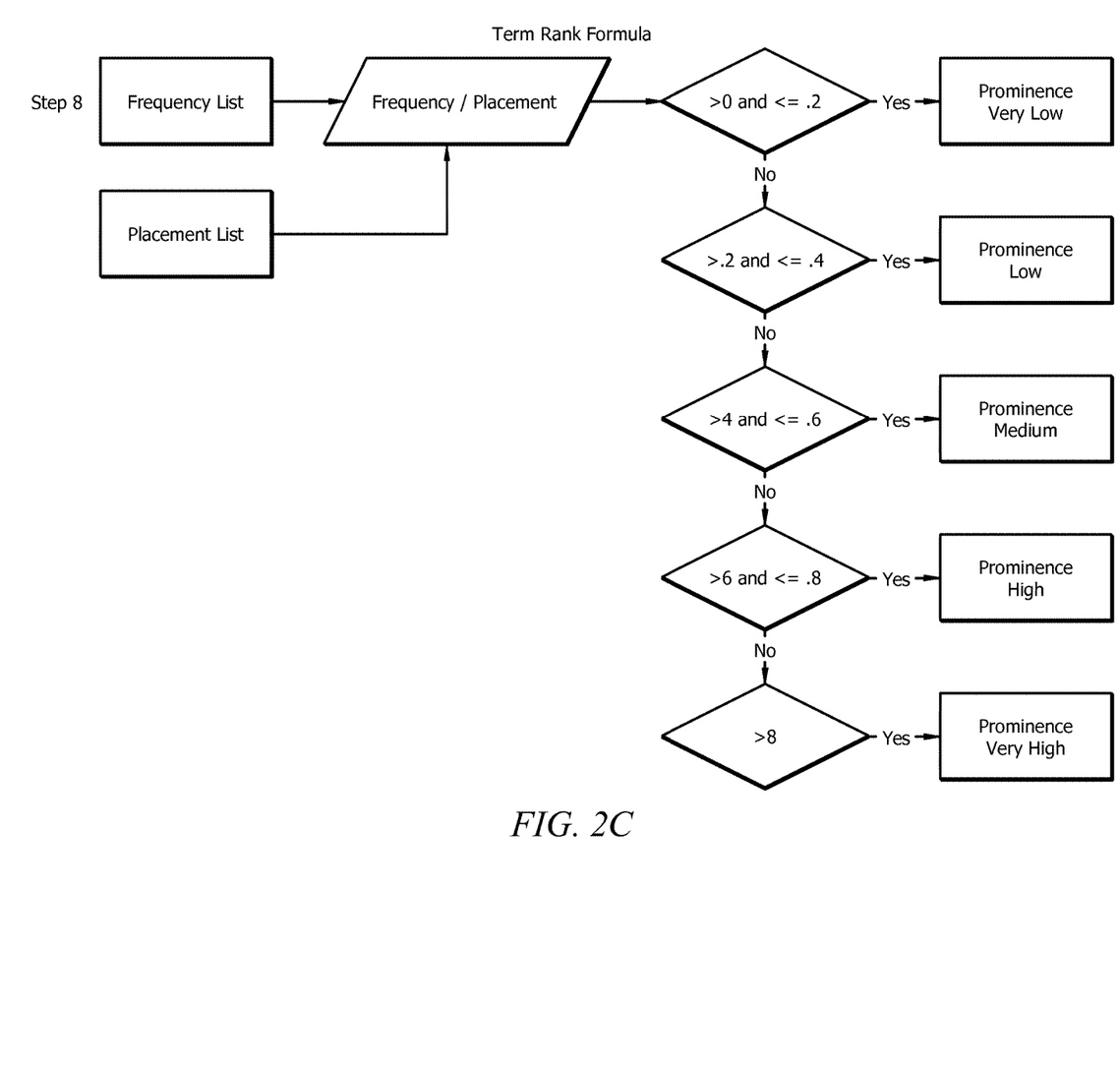

The prominence of each term in the target list also may be identified (see FIG. 2C, step 8). The frequency of the term in the target list may be divided by the placement of the term to produce a prominence value. To calculate the prominence of a term, an instruction may be sent to the processor to create an array in memory of the numeric value representing the frequency of each term and a numeric value of the placement of each term. Once created, an instruction may be sent to the processor to perform a mathematical calculation to find the product of a division of X divided by Y where X may represent the frequency numeric value of a term and Y may represent the numeric value of the placement of the term. The result of this instruction may be held in memory for further processing.

If the prominence value is greater than zero but less than 0.2, then the prominence may be considered to be "very low." If the prominence value is greater than 0.2 but less than 0.4, then the prominence may be considered to be "low." If the prominence value is greater than 0.4 but less than 0.6, then the prominence may be considered to be "medium." If the prominence value is greater than 0.6 but less than 0.8, then the prominence may be considered to be "high." If the prominence value is greater than 0.8, then the prominence may be considered to be "very high."

A ranking of the keyword may be obtained and presented to the user for each term in the target list (see FIG. 2D, step 9) according to embodiments of the present disclosure. A ranking may be created by sending an instruction to the processor to create an array in memory of the numeric values of each keyword's density and prominence. Once created, an instruction may be sent to the processor to use a logical computation to compare the numeric values in the memory array of keyword density and prominence values against the median density held in a separate memory array.

Figure 2D:
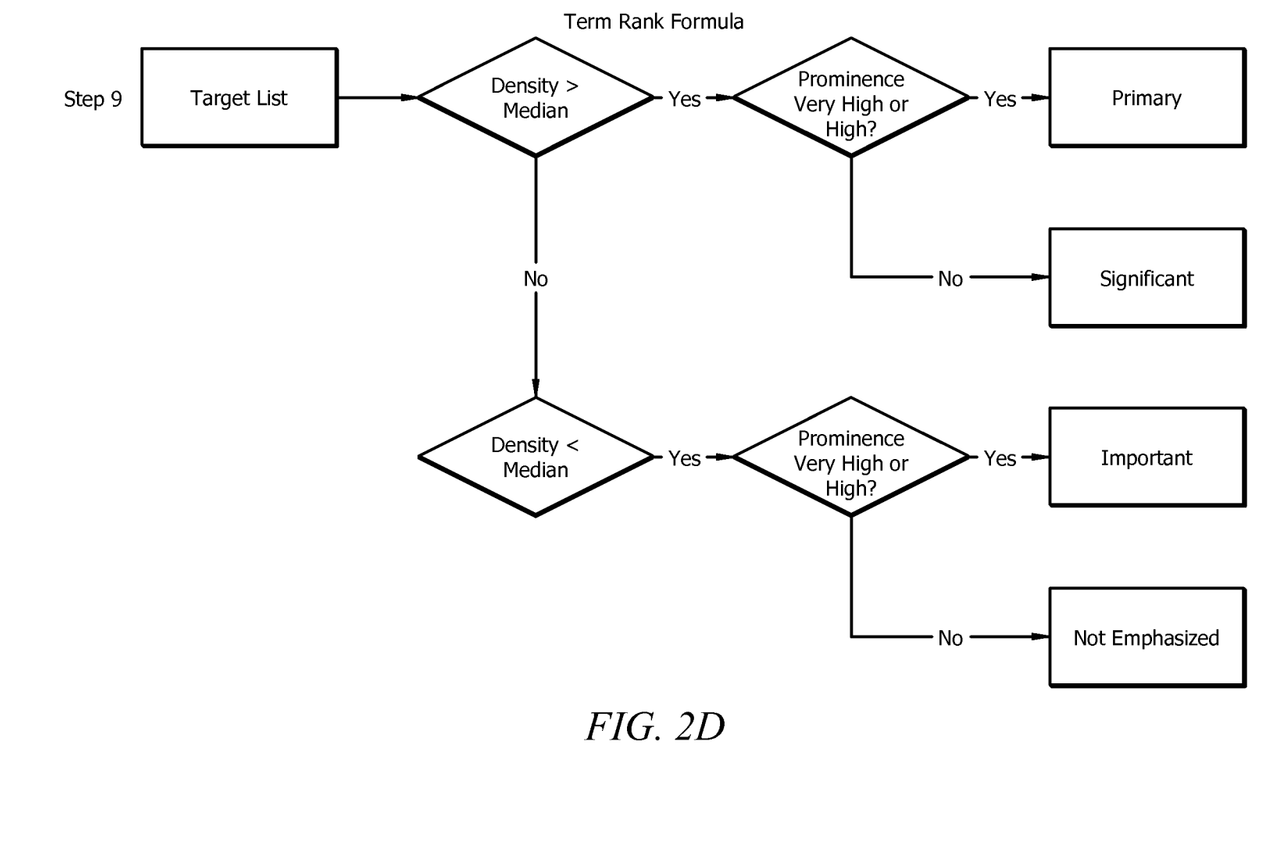

If the target list term(s) density is greater than the median density and the prominence value is high or very high, then the ranking may be identified as "primary." If the target list term(s) density is less than or equal to the median density and the prominence value is high or very high, then the ranking may be identified as "important." If the target list term(s) density is greater than the median density and the prominence value is not high or very high, then the ranking may be identified as "significant." If the target list term(s) density is less than or equal to the median density and the prominence value is not high or very high, then the ranking is identified as "not emphasized." It should be appreciated that the labels associated with the different rankings may be relabeled without departing from the present disclosure.

Figure 3:
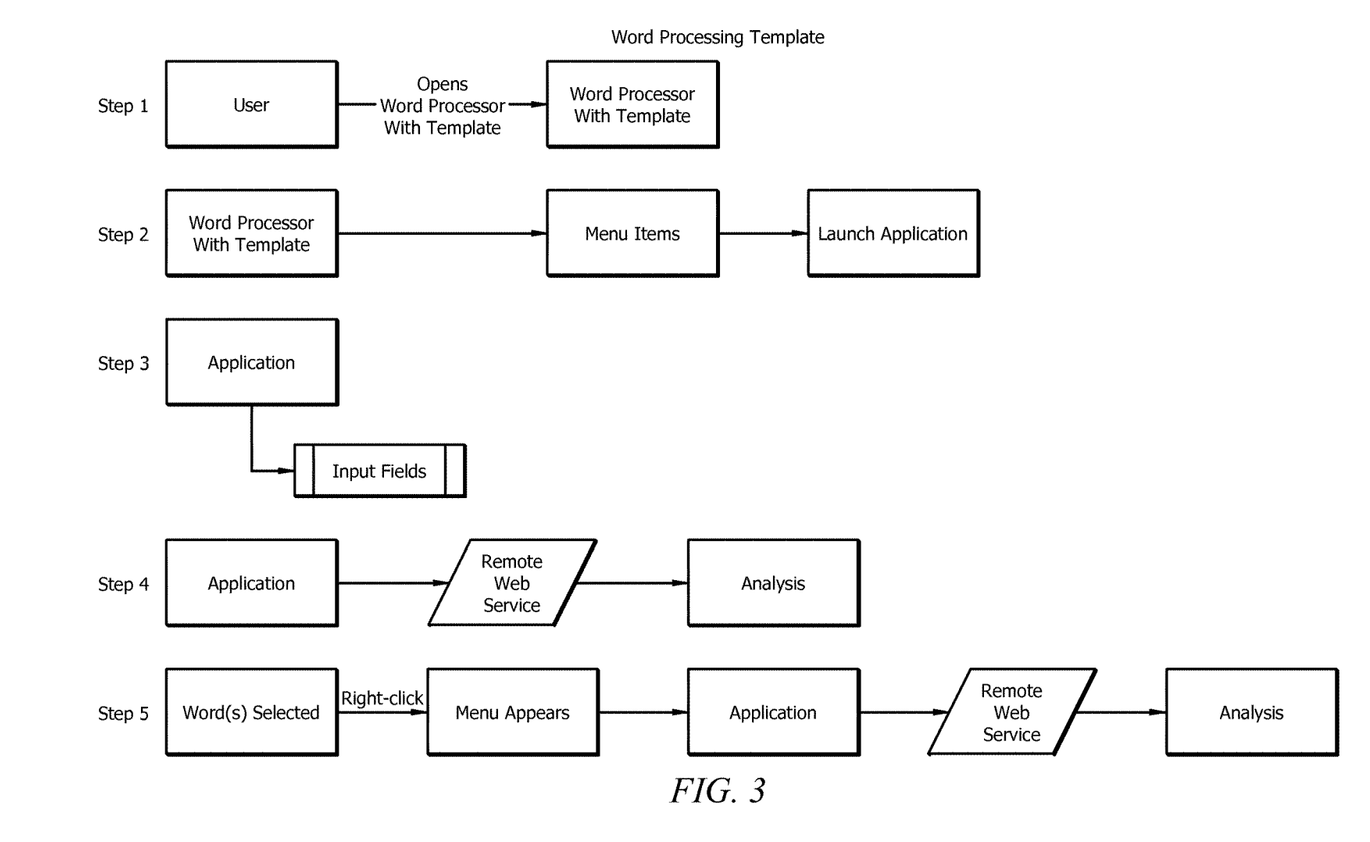
FIG. 3 depicts a system and method for word processing integration according to an embodiment of the present disclosure.

Systems and methods according to embodiments of the present disclosure may allow for interaction between a word processing software program and external data sources for the search and analysis of terms and content for improved indexing by search engines (see FIG. 3). A template may be provided for any word processing application that accepts or uses templates that combine interface options and coding for the user (see FIG. 3, step 1). This template may provide a list of input fields for the user to enter specific sections of text that may align with and may be used by structured markup languages such as HTML.

Within a user interface of a word processing software program, a menu item may be presented to a user that may allow the user to launch an application, either a built-in programming language associated with the word processing program or via a separate application (see FIG. 3, step 2).

This may include a pop-up window wherein a user may enter web publishing information, including but not limited to, HTML title, meta description, keyword(s), and publishing site. The application may then load a user-input form (see FIG. 3, step 3). This form may include input field elements from a template file that may be retrieved upon launch of the application. Based on these inputs, the application may then submit the values to a remote web service via the Internet and obtain a response from the remote web service for display to a user (see FIG. 3, step 4). It should be appreciated that the values submitted to and the response received from the remote web service may be a list of additional details about the values submitted. For example, for a term(s) submitted, the response may include an analysis of the term(s) related to its usage within search engines and/or social media platforms. For values submitted, the response may include an analysis of how the values are structured along with analysis that compares the terms within a file or page to terms used within a website, for example, that may be specified as part of the input according to embodiments of the present disclosure. The website submitted must be a properly formed URL structure that includes both the sub-domain and domain name (i.e., www.cnn.com). The inclusion of the web protocol must include either http or https.

A user also may select a word or words within the content of the template, and through a user-input mechanism, such as a right click or another keyboard or external input combination, receive an on-screen list of options that may include the ability to open an application (see FIG. 3, step 5). Upon opening this application, the term selected or highlighted may be automatically included in an input field within the application and used by the application for submission to a remote web service for the retrieval of specific analysis information on the term as previously described. The automation may be performed by sending an instruction to the operating system from the application to identify a unique input element within a specified word processing program (as recorded in the setup of the application) and extract the value of the element held in the web processors memory.

Figure 4:
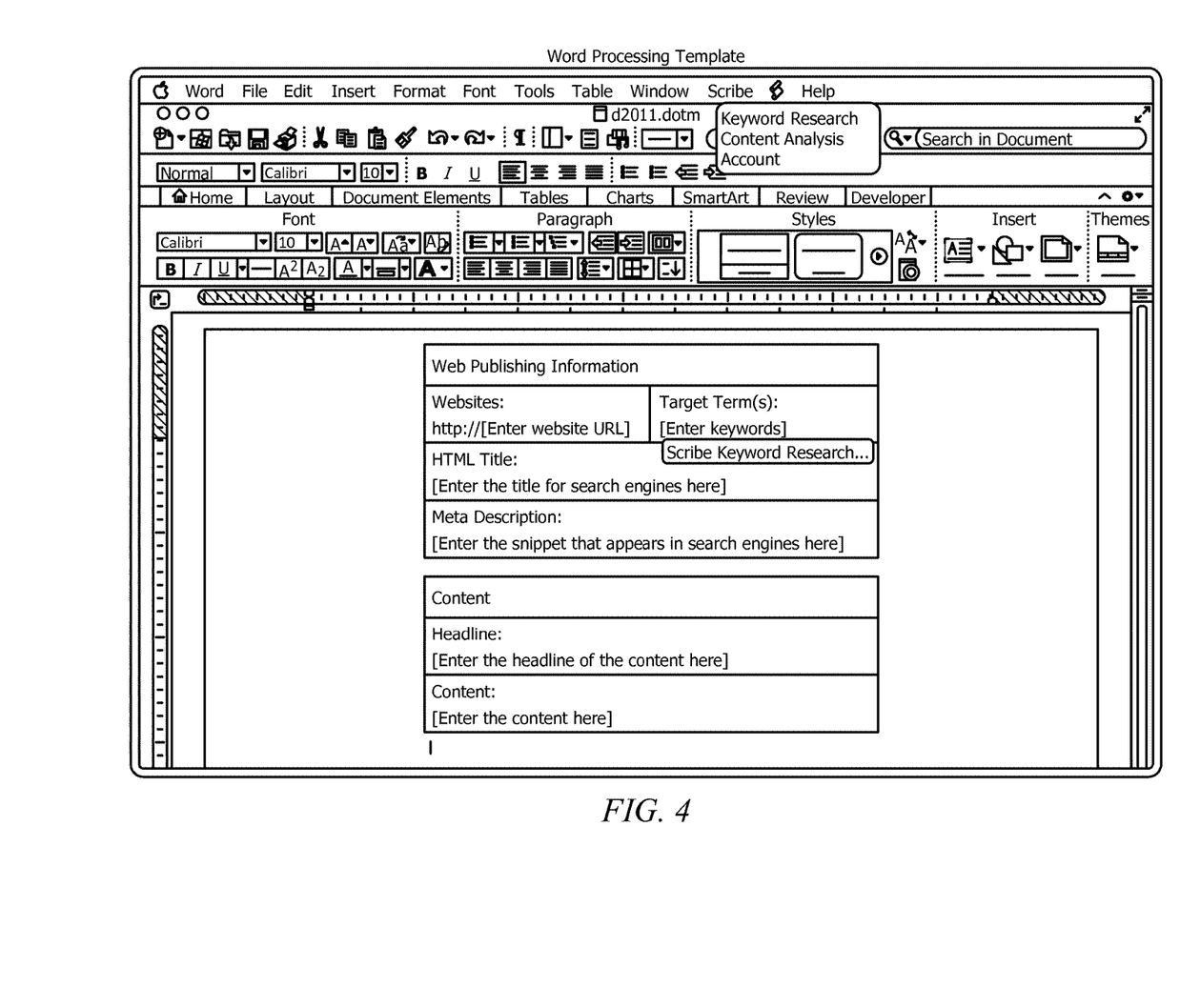
FIG. 4 depicts a word processing template according to an embodiment of the present disclosure.

FIG. 4 depicts a word processing template according to an embodiment of the present disclosure. This may be a default template design that may be loaded when Macros are enabled according to an embodiment of the present disclosure. However, the template may be configured in other manners without departing from the present disclosure. The template may include web publishing information wherein a user may enter a website URL, target term(s), HTML title (where a title to be used by search engines may be entered) and/or Meta description (where a snippet that may appear in search engines may be entered). A pop up list may appear when a term is highlighted, and then a user input (such as a right-click on a mouse) may launch a menu item. A menu may then appear when the menu item Scribe is selected. The template also may include content information wherein a user may enter a headline of the content as well as the content according to embodiments of the present disclosure.

Accordingly, in embodiments of the present disclosure, an application may take one or more elements of the content within a file, such as a Word document, and use those elements in an application that may return an analysis of those elements to the user within the experience of a desktop environment or within a particular software program, such as Microsoft Word. A user may use the template and select a word or words. These selected words may be input into defined fields within the application, and a response may be provided to the user for review. Thus, the application, such as Microsoft Word, may be used to do keyword research and content analysis.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

The invention claimed is:

1. A computer-based method of search term ranking, the method comprising:
receiving a corpus of search terms forming a database index and storing in a computer memory;
comparing the search terms in the database index to search terms identified within a page to generate a target list;
generating a frequency count of the number of times that each of the search terms is used within the page;
determining a density by dividing the frequency count by the total number of unique search terms found in the page;
calculating the prominence of a search term by sending an instruction to a processor to create an array in the computer memory of a value representing the frequency of each search term and a value of the placement of each search term;
sending an instruction to the processor to identify the prominence value through dividing the frequency value of a search term by the value of the placement of the search term, wherein when the prominence value is at least 0.6, the prominence is high,
creating a ranking of the search term by sending an instruction to the processor to create an array in the computer memory of the values of each search term's density and prominence; and
sending an instruction to the processor to use a logical computation to compare the values in the array of each search term's density and prominence values against a median density held in a separate array,
wherein when the target list term density is greater than the median density and the prominence value is at least 0.6, the ranking of the keyword is primary, and
wherein each of the steps is performed by one or more processors.

2. The method of claim 1 wherein the database index includes the search terms and the number of times that the search terms have been entered into one or more search engines within a defined time period.

3. The method of claim 1, the comparing step comprising:
loading the search terms in the database index into a computer memory; and
using a regular expression command to a processor, examining the search terms and identifying parts that match through a bit expression of 1 or 0, wherein 1 indicates the comparison is a match and 0 indicates that that the comparison does not match.

4. The method of claim 1 further comprising:

recording a median density for all search terms in the target list, wherein the median density is determined by:

sending an instruction to a processor to load from the computer memory each value that represents a density of a search term;

instructing the processor to create an array in the computer memory of each value and order the array from the lowest value to the highest value; and sending an instruction to the processor to identify the value in the array that represents the middle value in the array.

5. The method of claim 1 further comprising:

sending an instruction to a processor to load into the computer memory an array of all characters within a page; and assigning a value to each character beginning at 1;

sending an instruction to the processor to perform a regular expression comparison; and when a first search term is found through the regular expression comparison, recording the value of the starting character of the first search term.

6. The method of claim 5 further comprising:

identifying additional search terms through the regular expression comparison; and ignoring previously found search terms by sending an instruction to the processor to construct an array in memory of terms found, wherein terms not found are not included in the array.

* * * * *